(12) United States Patent
Hoshino et al.

(10) Patent No.: US 8,953,236 B2
(45) Date of Patent: Feb. 10, 2015

(54) SCANNING OPTICAL APPARATUS

(71) Applicants: Hidetaka Hoshino, Aichi (JP);
Yoshifumi Nakamura, Inazawa (JP);
Hitoshi Fujino, Tajimi (JP)

(72) Inventors: Hidetaka Hoshino, Aichi (JP);
Yoshifumi Nakamura, Inazawa (JP);
Hitoshi Fujino, Tajimi (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/099,454

(22) Filed: Dec. 6, 2013

(65) Prior Publication Data

US 2014/0160546 A1 Jun. 12, 2014

(30) Foreign Application Priority Data

Dec. 7, 2012 (JP) ................................. 2012-267991

(51) Int. Cl.
*G02B 26/08* (2006.01)
*G02B 26/12* (2006.01)
*G02B 7/00* (2006.01)

(52) U.S. Cl.
CPC .............. *G02B 26/124* (2013.01); *G02B 7/008* (2013.01)
USPC .................................... 359/206.1; 359/216.1

(58) Field of Classification Search
CPC . G02B 26/124; G02B 26/125; G02B 27/4227
See application file for complete search history.

(56) References Cited

U.S. PATENT DOCUMENTS

| 2006/0077500 A1* | 4/2006 | Hayashi et al. ............... 359/205 |
| 2011/0228368 A1* | 9/2011 | Sakai et al. ................ 359/204.1 |
| 2013/0077144 A1* | 3/2013 | Nakamura et al. ......... 359/226.1 |
| 2014/0085696 A1* | 3/2014 | Hoshino et al. ............. 359/207.7 |

FOREIGN PATENT DOCUMENTS

| JP | 4819436 B2 | 11/2011 |
| JP | 2013-076807 A | 4/2013 |

\* cited by examiner

*Primary Examiner* — James Phan
(74) *Attorney, Agent, or Firm* — Merchant & Gould PC

(57) ABSTRACT

In a scanning optical apparatus, an illumination optical system has a diffractive power $\phi dM$ and a refractive power $\phi nM$ in a main scanning direction, and a ratio $\phi nM/\phi dM$ in the main scanning direction for a focal length fi in a range of 10-22 mm satisfies: $g2(fi) \leq \phi nM/\phi dM \leq g1(fi)$, where $A(Z)=(1.897\times10^7)Z^2+6744Z+0.5255$, $B(Z)=(2.964\times10^7)Z^2+5645Z+0.6494$, $C(Z)=(3.270\times10^7)Z^2+3589Z+0.5250$, $D(Z)=(5.016\times10^7)Z^2+4571Z+0.8139$, $g1(fi)=fi\{D(Z)-B(Z)\}/12-5D(Z)/6+11B(Z)/6$, $g2(fi)=fi\{C(Z)-D(Z)\}/12-5C(Z)/6+11A(Z)/6$.

5 Claims, 7 Drawing Sheets

SCANNING OPTICAL APPARATUS

CROSS-REFERENCE TO RELATED APPLICATION(S)

This application claims priority from Japanese Patent Application No. 2012-267991 filed on Dec. 7, 2013, the disclosure of which is incorporated herein by reference in its entirety.

TECHNICAL FIELD

The present invention relates to a scanning optical apparatus suitable for use in an electrophotographic image forming apparatus or the like.

BACKGROUND ART

A scanning optical apparatus for use in an electrophotographic image forming apparatus converts a beam of light emitted from a light source into a dot-like image to be formed on a target surface of a photoconductor drum or the like and scans the target surface in a direction of an axis of the photoconductor drum (main scanning direction) with the dot-like image. The scanning optical apparatus includes a deflector which deflect a beam of light in the main scanning direction, an illumination optical system provided upstream of the deflector, and a scanning optical system provided downstream of the deflector. The illumination optical system focuses the beam of light near the deflector in a sub-scanning direction and makes the same into a parallel or nearly parallel beam in the main scanning direction. On the other hand, the scanning optical system serves to convert the beam of light directed from the deflector, into a dot-like image on the target surface to be scanned.

As the ambient temperature of the scanning optical apparatus (the temperature of the surrounding medium which comes into contact with the apparatus) changes, the dimensions of various parts thereof as well as the properties of various optical elements thereof will change, and the focal point would disadvantageously be shifted forward or backward from the target surface. This problem would be conspicuous when the illumination optical system includes a lens made of plastic (resin) which may be adopted in view of cost reduction. In order to address this problem, the illumination optical system may include a refractive surface and a diffractive surface so that an undesirable shift of the focal point (image plane shift) due to change in temperature is suppressed. For example, it has been assumed to be preferable that a ratio of refractive power to diffractive power of the illumination optical system in the main scanning direction is in a range of 1.437 to 2.669, and that a ratio of refractive power to diffractive power of the illumination optical system in the sub-scanning direction is in a range of 1.437 to 2.669.

SUMMARY

Applicant has noted that coefficients of linear expansion of members for holding the light source and the illumination optical system and a change in temperature of the scanning optical system should be significant, and that a scanning optical apparatus comprising a housing made of resin having a great coefficient of linear expansion would be difficult to achieve sufficient performance.

With this in view, it is one aspect of the present invention to provide a scanning optical apparatus in which proper temperature compensation can be achieved.

More specifically, according to one or more embodiments of the present invention, a scanning optical apparatus is provided which comprises a light source, a deflector, an illumination optical system and a scan lens. The deflector is configured to deflect a beam of light emitted from the light source in a main scanning direction. The illumination optical system is disposed between the light source and the deflector and configured to convert the beam of light emitted from the light source into a beam of light slightly converging in the main scanning direction and focused near the deflector in a sub-scanning direction. The scan lens is configured to cause the beam of light deflected by the deflector to be focused into a dot-like image on a target surface to be scanned. The scan lens satisfies:

$$0.2 \leq 1 - s'/fm \leq 0.5 \tag{1}$$

where s' is a distance from an image-space principal point in the main scanning direction to an image point, and fm is a focal length in the main scanning direction.

The illumination optical system has at least one rotation-symmetric diffractive surface and at least one anamorphic refractive surface, the illumination optical system having a focal length fi [mm] in the main scanning direction, which satisfies:

$$10 \leq fi \leq 22 \tag{2}$$

A ratio mM/mS of a lateral magnification mM in the main scanning direction to a lateral magnification mS in the sub-scanning direction, of an entire optical system which includes the illumination optical system and the scan lens, satisfies:

$$mM/mS \geq 1.38 \tag{3}$$

Furthermore, a holding member provided to retain a distance between the light source and the illumination optical system has a coefficient Z of linear expansion [1/K] which satisfies:

$$3.05 \times 10^{-5} \leq Z \leq 9.50 \times 10^{-5} \tag{4}$$

The illumination optical system has a refractive power $\phi nM$ in the main scanning direction and a diffractive power $\phi dM$ in the main scanning direction, and a ratio $\phi nM/\phi dM$ of the refractive power $\phi nM$ to the diffractive power $\phi dM$ in the main scanning direction satisfies:

$$g2(fi) \leq \phi nM/\phi dM \leq g1(fi) \tag{5}$$

where $A(Z)=(1.897\times10^7)Z^2+6744Z+0.5255$, $B(Z)=(2.964\times10^7)Z^2+5645Z+0.6494$, $C(Z)=(3.270\times10^7)Z^2+3589Z+0.5250$, $D(Z)=(5.016\times10^7)Z^2+4571Z+0.8139$, $g1(fi)=fi\{D(Z)-B(Z)\}/12-5D(Z)/6+11B(Z)/6$, $g2(fi)=fi\{C(Z)-D(Z)\}/12-5C(Z)/6+11A(Z)/6$.

BRIEF DESCRIPTION OF THE DRAWINGS

The above aspect, its advantages and further features of the present invention will become more apparent by describing in detail illustrative, non-limiting embodiments thereof with reference to the accompanying drawings, in which.

DESCRIPTION OF EMBODIMENTS

A detailed description will be given of an illustrative, non-limiting embodiment of the present invention with reference made to the drawings where appropriate.

Figure 1:
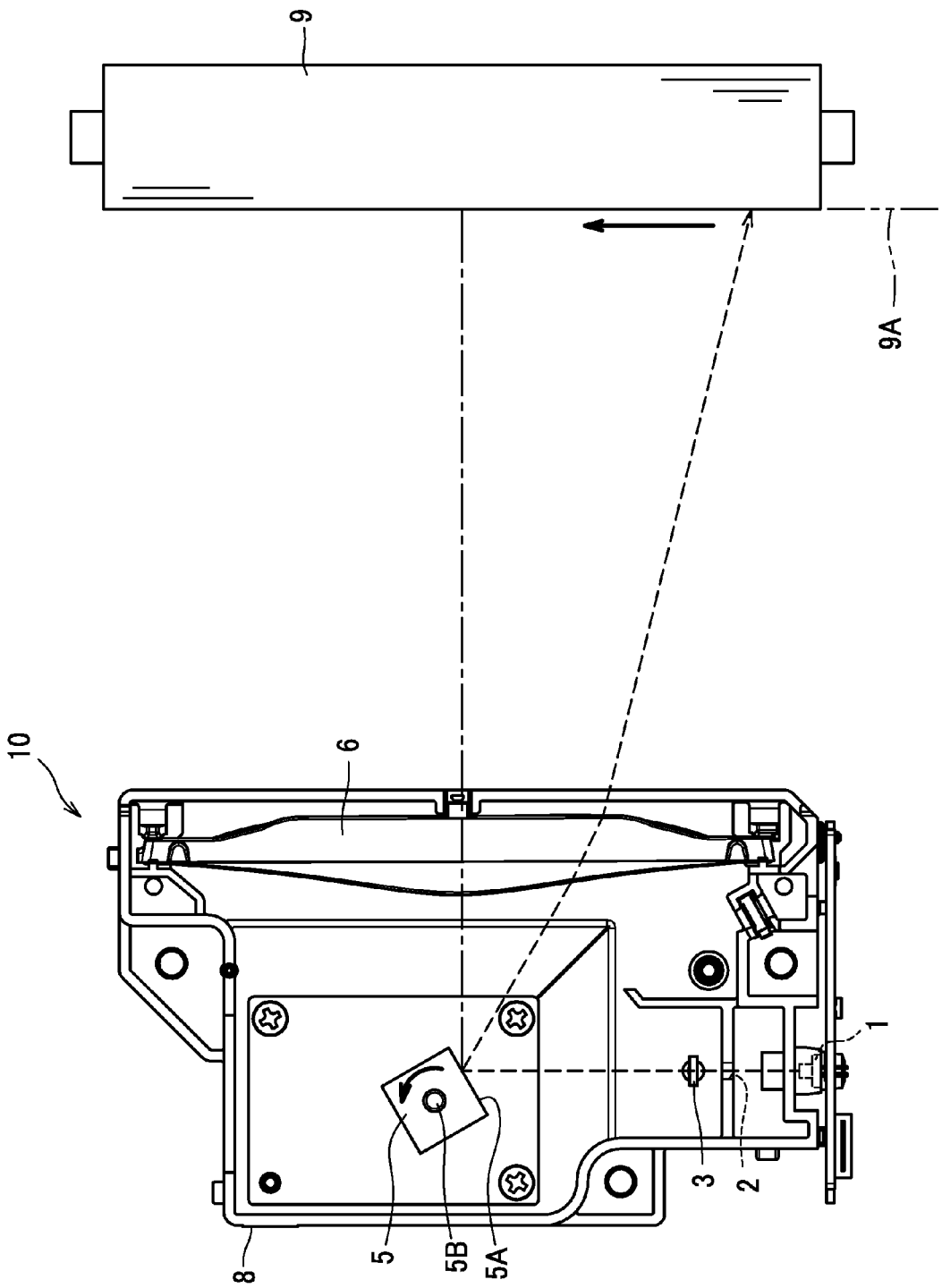
FIG. 1 is a sectional view of a scanning optical apparatus according to one exemplary embodiment taken along a main scanning plane.

As shown in FIG. 1, a scanning optical apparatus 10 according to one embodiment comprises a integrally-molded resinous (plastic) housing 8 and several components housed therein which includes a semiconductor laser 1 as an example of a light source, an aperture stop 2, a diffraction lens 3 as an example of an illumination optical system, a polygon mirror 5 as an example of a deflector, and an f-theta (fθ) lens 6 as an example of a scan lens. With these components, a laser beam emitted from the semiconductor laser 1 is converged into a spot-like image on a target (to-be-scanned) surface 9A of a photoconductor drum 9, and the target surface 9A is scanned with the spot-like image. The aperture stop 2 is configured as a rib having a through hole, and the rib is provided inside the housing 8 integrally with the housing 8. The diffraction lens 3 is bonded directly to the housing 8.

This housing 8 is a holding member provided to retain a distance between the semiconductor laser 1 as a light source and the diffraction lens 3 as an illumination optical system, and the expansion and contraction of the holding member due to change in temperature would affect the quality of an image formed on the target surface 9A. In the scanning optical apparatus 10 configured according to this embodiment, the coefficient Z of linear expansion is in the range of:

$$3.05 \times 10^{-5} \leq Z \leq 9.50 \times 10^{-5} \quad (4)$$

In other words, the holding member is made of a material which has a relatively great coefficient Z of linear expansion. In order to reduce variation in the amount of image plane shift which would result from change in temperature, it is preferable that the coefficient Z of linear expansion be made smaller if possible; that is, the following range may be preferable:

$$3.05 \times 10^{-5} \leq Z \leq 7.40 \times 10^{-5} \quad (6)$$

The holding member is not necessarily composed of a single part, but may be an assembly of several parts. For example, the holding member may be a combination of parts made of metal and parts made of resin material. In this case, the resultant of coefficients of linear expansion of these parts which hold the light source and the illumination optical system to thereby retain the distance between them may be considered to be the coefficient Z.

The semiconductor laser 1 is a device configured to generate a slightly divergent laser beam (a beam of light). A light-emitting element of the semiconductor laser 1 is configured to give off and interrupt light emissions in accordance with an image formed on the target surface 9A of the photoconductor drum 9 under control of a controller (not shown).

The aperture stop 2 is a member having an opening which determines a size in the sub-scanning direction of a laser beam emitted from the semiconductor laser 1.

The diffraction lens 3 is disposed between the semiconductor laser 1 and the polygon mirror 5 and configured to convert the beam of light emitted from the semiconductor laser 1 and passed through the aperture stop 2 into a beam of light slightly converging in a main scanning direction (the direction of the beam of light sweeping laterally with respect to the direction of travel thereof in FIG. 1; the direction of deflection thereof effected by the polygon mirror 5) and focused near a specular surface 5A of the polygon mirror 5 in a sub-scanning direction (the direction perpendicular to the main scanning direction and to the drawing sheet of FIG. 1).

Figure 2:
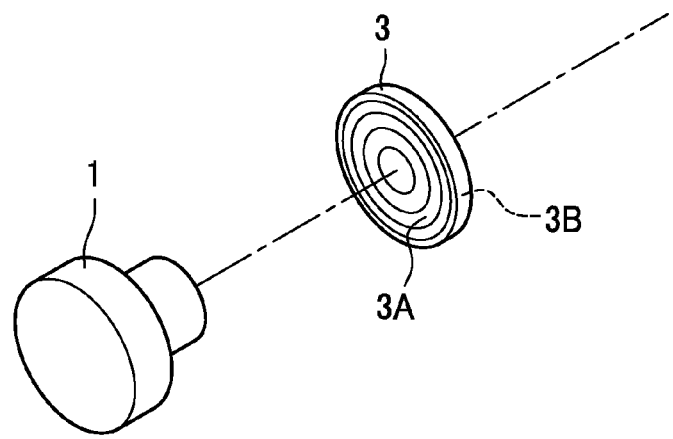
FIG. 2 is a perspective view showing an illumination optical system according to one embodiment.

As shown in FIG. 2, the diffraction lens 3 in this embodiment has an incident-side surface 3A (surface at a light beam incident side on which the beam of light strikes) configured as a rotation-symmetric diffractive surface and an exit-side surface 3B (surface at a light beam exit side from which the beam of light goes out) configured as an anamorphic refractive surface. In view of the costs, it may be preferable that the diffraction lens 3 is a single lens made of plastic (resin). However, the illumination optical system consistent with the present invention is not limited to this specific configuration; for example, the illumination optical system may comprise a lens made of glass, and the number of lenses (surfaces) is also not limited to one but may be more as long as the illumination optical system is provided with at least one refractive surface and at least one diffractive surface. In order to reduce aberration such as a spherical aberration of the illumination optical system, it may be preferable that the illumination optical system be configured to have the rotation-symmetric diffractive surface provided at a lens surface closest to the light source, and to have the anamorphic refractive surface provided at a lens surface from which the beam of light exits the illumination optical system.

The diffraction lens 3 has a focal length fi [mm] in the main scanning direction, which satisfies:

$$10 \leq fi \leq 22 \quad (2)$$

As the focal length fi is not less than 10 [mm], the lateral magnification can be moderately restricted so that the magnification will not become too great. As the focal length fi is not greater than 22 [mm], the apparatus can be designed to be compact in size, and the loss of the efficiency of use of light in the semiconductor laser 1 can be suppressed.

Also in this embodiment, a ratio mM/mS of a lateral magnification mM in the main scanning direction to a lateral magnification mS in the sub-scanning direction, of an entire optical system which includes the illumination optical system (diffraction lens 3) and the scan lens (f-theta lens 6) and other components, if any, provided between the illumination optical system and the scan lens, satisfies:

$$mM/mS \geq 1.38 \quad (3)$$

As shown in Examples which will be described later, the ratio of magnification mM/mS in the main scanning direction not less than 1.38 serves to reduce the amount of image plane shift caused by the change in ambient temperature.

The diffraction lens 3 has a diffractive power φdM in the main scanning direction and a refractive power φnM in the main scanning direction, and a ratio φnM/φdM of the refractive power φnM to the diffractive power φdM of the diffraction lens 3 in the main scanning direction satisfies:

$$g2(fi) \leq \phi nM/\phi dM \leq g1(fi) \quad (5)$$

where $A(Z)=(1.897 \times 10^7)Z^2+6744Z+0.5255$, $B(Z)=(2.964 \times 10^7)Z^2+5645Z+0.6494$, $C(Z)=(3.270 \times 10^7)Z^2+3589Z+$ 0.5250, $D(Z)=(5.016\times10^7)Z^2+4571Z+0.8139$, $g1(fi)=fi\{D(Z)-B(Z)\}/12-5D(Z)/6+11B(Z)/6$, $g2(fi)=fi\{C(Z)-D(Z)\}/12-5C(Z)/6+11A(Z)/6$, and the focal length fi in the main scanning direction is in the range as indicated in inequality (2) above (10≤fi≤22).

Since the condition indicated by inequality (5) is satisfied, the image plane shift (i.e., a change in the position of image plane due to the change in temperature and the change in wavelength of the beam of light, called "mode hopping") can be suppressed satisfactorily in the main scanning direction. To be more specific, the amount of image plane shift in the main scanning direction is not greater than 1 [mm] and the amount of image plane shift in the sub-scanning direction is not greater than 4 [mm] with a change in temperature of ±30° C. from a reference temperature of 25° C., with the result that a sufficient performance for illumination can be achieved in the range of temperatures at which the apparatus is operated for actual use.

The polygon mirror 5 has a plurality of specular surfaces 5A disposed equidistantly from an axis 5B of rotation of the polygon mirror 5; the polygon mirror 5 in this embodiment as shown in FIG. 1 has four specular surfaces 5A by way of example. The polygon mirror 5 spins at a constant rotational speed about the axis 5B of rotation and reflects and deflects a beam of light having passed through the diffraction lens 3 in the main scanning direction.

The scanning optical apparatus 10 includes only one f-theta lens 6 in this embodiment. The f-theta lens 6 is configured to convert the beam of light having been reflected and thus deflected by the polygon mirror 5 into a spot-like image to be focused on the target surface 9A to be scanned. The f-theta lens 6 is also configured to correct an optical face tangle error of each specular surface 5A of the polygon mirror 5. The f-theta lens 6 has f-theta characteristics such that the beam of light deflected at a constant angular velocity by the polygon mirror 5 is converted into a beam of light that scans the target surface 9A at a constant linear velocity.

Figure 3:
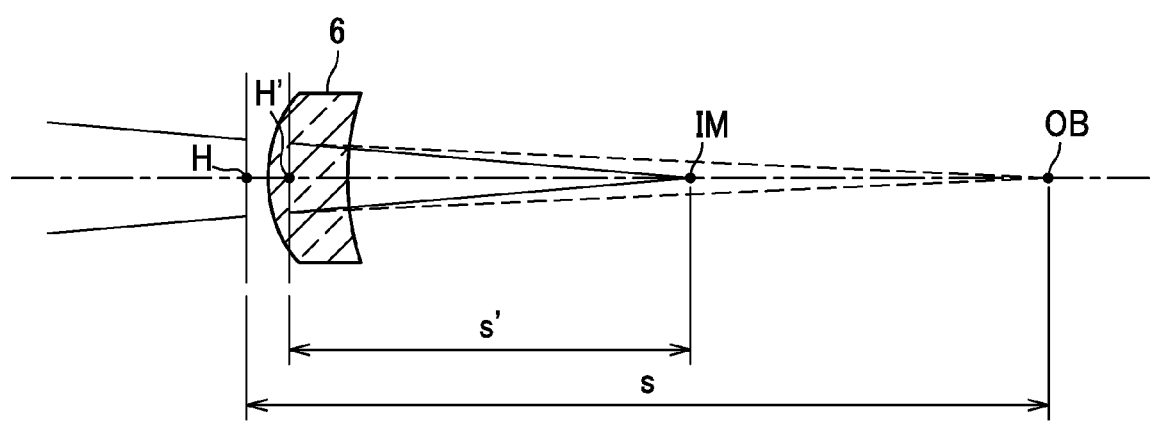
FIG. 3 is a diagram for explaining a lateral magnification of a scan lens.

Referring to FIG. 3, the f-theta lens 6 has a lateral magnification β in the main scanning direction as expressed with several parameters thereof which include a distance s from an object point OB to an object-space principal point H in the main scanning direction, a distance s' from an image-space principal point H' in the main scanning direction to an image point IM, and a focal length fm of the f-theta lens 6 in the main scanning direction. As $1/fm=1/s'-1/s$ is satisfied, the lateral magnification β of the f-theta lens 6 in the main scanning direction is represented as follows:

$$\beta = s'/s = 1 - s'/fm$$

In the present embodiment, the lateral magnification β(=1−s'/fm) in the main scanning direction of the f-theta lens 6 is in the following range:

$$0.2 \leq 1 - s'/fm \leq 0.5 \quad (1)$$

As the lateral magnification β is not less than 0.2, the scanning optical apparatus 10 can be designed to be compact in size. As the lateral magnification β is not greater than 0.5, the jitter caused by vibrations of the specular surfaces 5A of the polygon mirror 5 can be reduced low.

Although the illustrative embodiment of the present invention has been described above, the present invention is not limited to the above-described embodiments. Various modifications and changes may be made to the specific structures and arrangement without departing from the scope of the present invention.

For example, the diffraction lens 3 in the present embodiment is configured to have its incident-side surface 3A configured as a diffractive surface and its exit-side surface 3B configured as a refractive surface, but may be configured vice versa, i.e., it may have a refractive surface provided at its incident side and a diffractive surface provided at its exit side.

The number of specular surfaces 5A of the polygon mirror 5 may be six, for example. As a deflector, a vibration mirror may be used instead of the polygon mirror 5.

EXAMPLES

Inventors named in the present application and their colleagues have investigated the influence, on the image plane shift associated with the change in ambient temperature, of adjustments made to the diffraction lens 3 (illumination optical system) by varying the ratio φnM/φdM of the refractive power φnM in the main scanning direction to the diffractive power φdM in the main scanning direction (hereinafter referred to as "main scanning direction power ratio").

To be more specific, the amount of image plane shift is calculated, as in EXAMPLES 1-5, using an optical system in which a single lens having a diffractive surface and an anamorphic refractive surface is adopted as an illumination optical system, by varying any of (1) magnification ratio mM/mS, (2) main scanning direction power ratio φnM/φdM, and (3) focal length fi in the main scanning direction of the diffraction lens. For example, the conditions and particulars of the optical system in EXAMPLE 1 are as follows:

Example 1

Wavelength of semiconductor laser: 792.6 [nm]

Range of temperature −5 to 55 [° C.]

Rate of change in wavelength of semiconductor laser: 0.238 [nm/° C.]

Focal length fi in main scanning direction of diffraction lens: 22 [mm]

Coefficient Z of linear expansion of member provided to retain distance between semiconductor laser and diffraction lens: $3.05\times10^{-5}$ [1/K]

Lateral magnification mM in main scanning direction of entire optical system: 6.69

Lateral magnification mS in sub-scanning direction of entire optical system: 4.85

Ratio of magnifications mM/mS: 1.38

Refractive power φnM in main scanning direction of diffraction lens: 0.021

Diffractive power φdM in main scanning direction of diffraction lens: 0.026

Main scanning direction power ratio φnM/φdM: 0.800

Refractive power φnS in sub-scanning direction of diffraction lens: 0.03267

Diffractive power φdS in sub-scanning direction of diffraction lens: 0.02564

Sub-scanning direction power ratio φnS/φdS: 1.27

Phase function of diffractive surface:

$$\phi = \sum_{n=1}^{10} C_n r^{2n}$$

$$C_1 = -0.0128$$

TABLE 1

Optical System in EXAMPLE 1

| SURFACE No. | SURFACE | RADIUS OF CURVATURE | | DISTANCE | REFRACTIVE INDEX | OPTICAL ELEMENT |
| --- | --- | --- | --- | --- | --- | --- |
| | | MAIN SCANNING DIRECTION | SUB-SCANNING DIRECTION | | | |
| 1 | | ∞ | ∞ | 0.970 | 1 | |
| 2 | | ∞ | ∞ | 0.250 | 1.511 | GLASS COVER |
| 3 | | ∞ | ∞ | 21.84 | 1 | |
| 4 | DIFFRACTIVE SURFACE | ∞ | ∞ | 2.000 | 1.527 | DIFFRACTION LENS |
| 5 | ANAMORPHIC SURFACE | −25.686 | −16.124 | 56.78 | 1 | |
| 6 | | ∞ | ∞ | 42.35 | 1 | |
| 7 | ANAMORPHIC SURFACE | 67.257 | −12.543 | 13.00 | 1.527 | fθ LENS |
| 8 | ANAMORPHIC SURFACE | 152.98 | −9.618 | 98.8 | 1 | |

Figure 4:
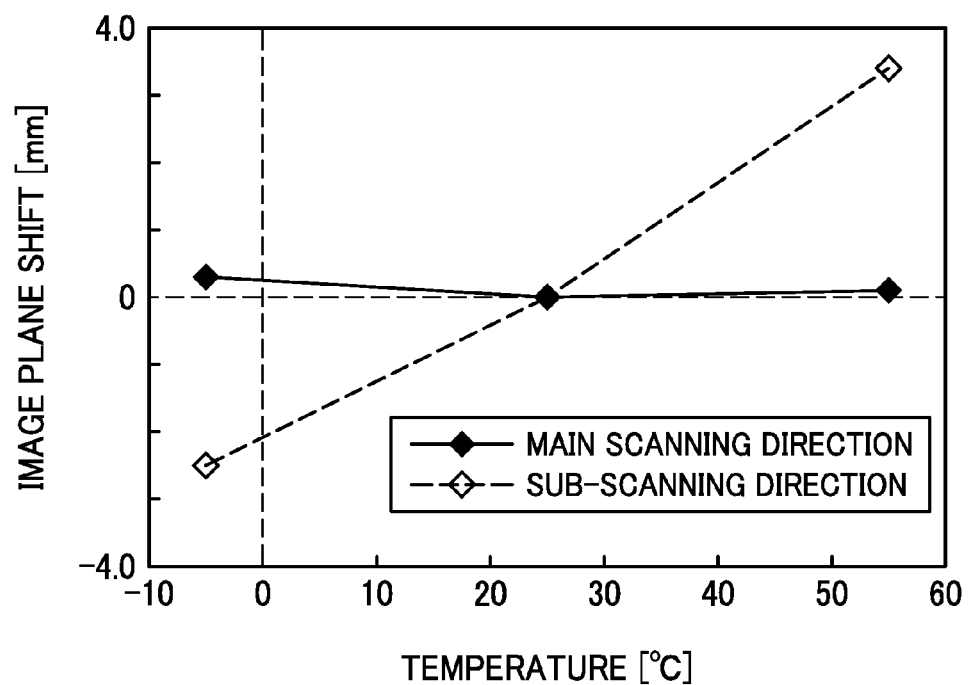
FIG. 4 is a graph showing temperature dependence of an image plane shift according to Example 1.

Temperature dependence of the amounts of image plane shift in the main scanning direction and in the sub-scanning direction in Example 1 is shown in FIG. 4. FIG. 4 represents focal positions shifted in the main scanning direction and the sub-scanning direction at temperatures of −5° C. and 55° C. from the image plane position at an ambient temperature (25° C.).

Figure 5:
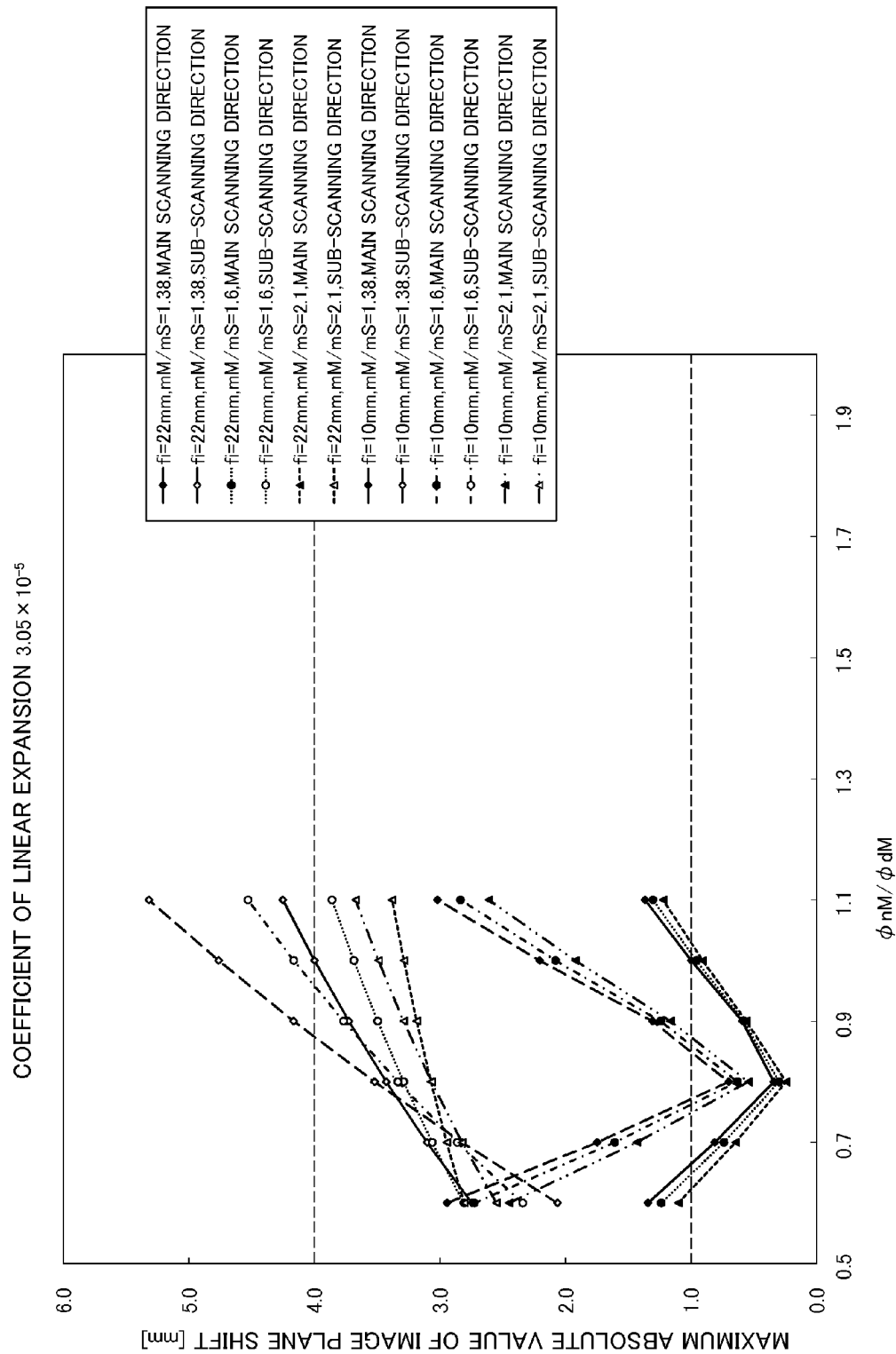
FIG. 5 is a graph showing a relationship between power ratios φnM/φdM in the main scanning direction and amounts of image plane shift, when a coefficient Z of linear expansion is $3.05 \times 10^{-5}$.

From the values (amounts) of image plane shift varying according to temperature as shown in FIG. 4, values of which the absolute values are relatively large are selected for each of the amounts of image plane shift in the main scanning direction and in the sub-scanning direction, and a graph is created which shows a relationship between the main scanning direction power ratios φnM/φdM and the maximum absolute values of image plane shift. For example, in FIG. 4, the maximum of the absolute value of image plane shift in the main scanning direction is 0.3 [mm] at −5° C., while the maximum of the absolute value of image plane shift in the sub-scanning direction is 3.4 [mm] at 55° C. In the graph of FIG. 5, these values of image plane shift 0.3 [mm] (solid lines connecting black diamond marks) and 3.4 [mm] (solid lines connecting white diamond marks) are plotted at φnM/φdM=0.80.

Other values (amounts of image plane shift in the main scanning direction and in the sub-scanning direction) obtained similarly by varying the parameters of the focal lengths fi, the magnification ratios mM/mS and the main scanning direction power ratios φnM/φdM are plotted in FIG. 5 from which it is shown that the higher the magnification ratio mM/mS is, the smaller the maximum absolute value of image plane shift (of the amounts of image plane shift) shows. The same tendency is observed when the coefficient Z of linear expansion takes some different value. Therefore, for the coefficients Z of linear expansion=6.50×10$^{-5}$ [1/K] and 9.50×10$^{-5}$ [1/K], the values at the smallest magnification ratio mM/mS=1.38 only are selected among the simulation results and shown in FIGS. 6 and 7, respectively.

Figure 6:
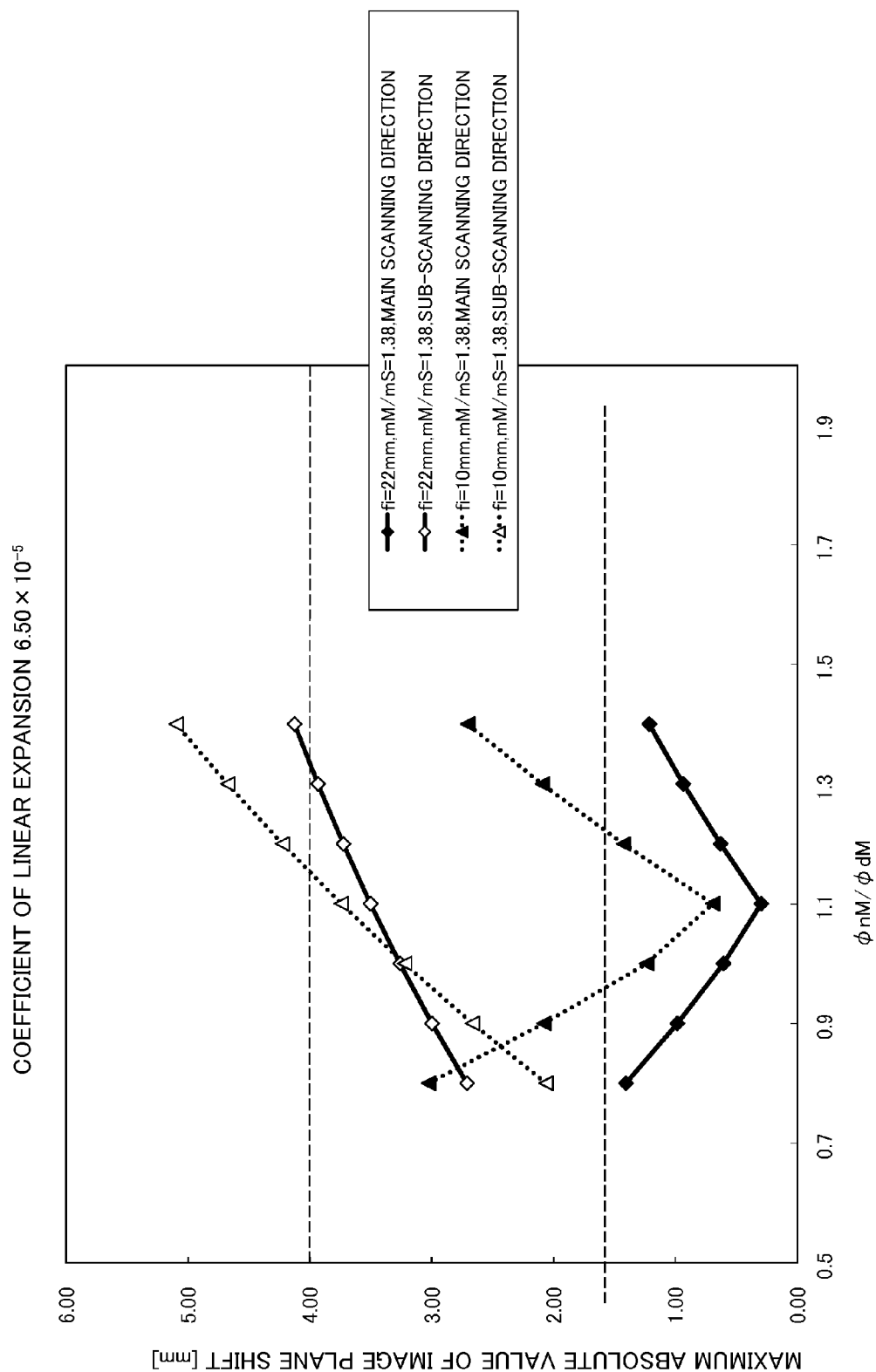
FIG. 6 is a graph showing a relationship between power ratios φnM/φdM in the main scanning direction and amounts of image plane shift, when a coefficient Z of linear expansion is $6.50 \times 10^{-5}$.
Figure 7:
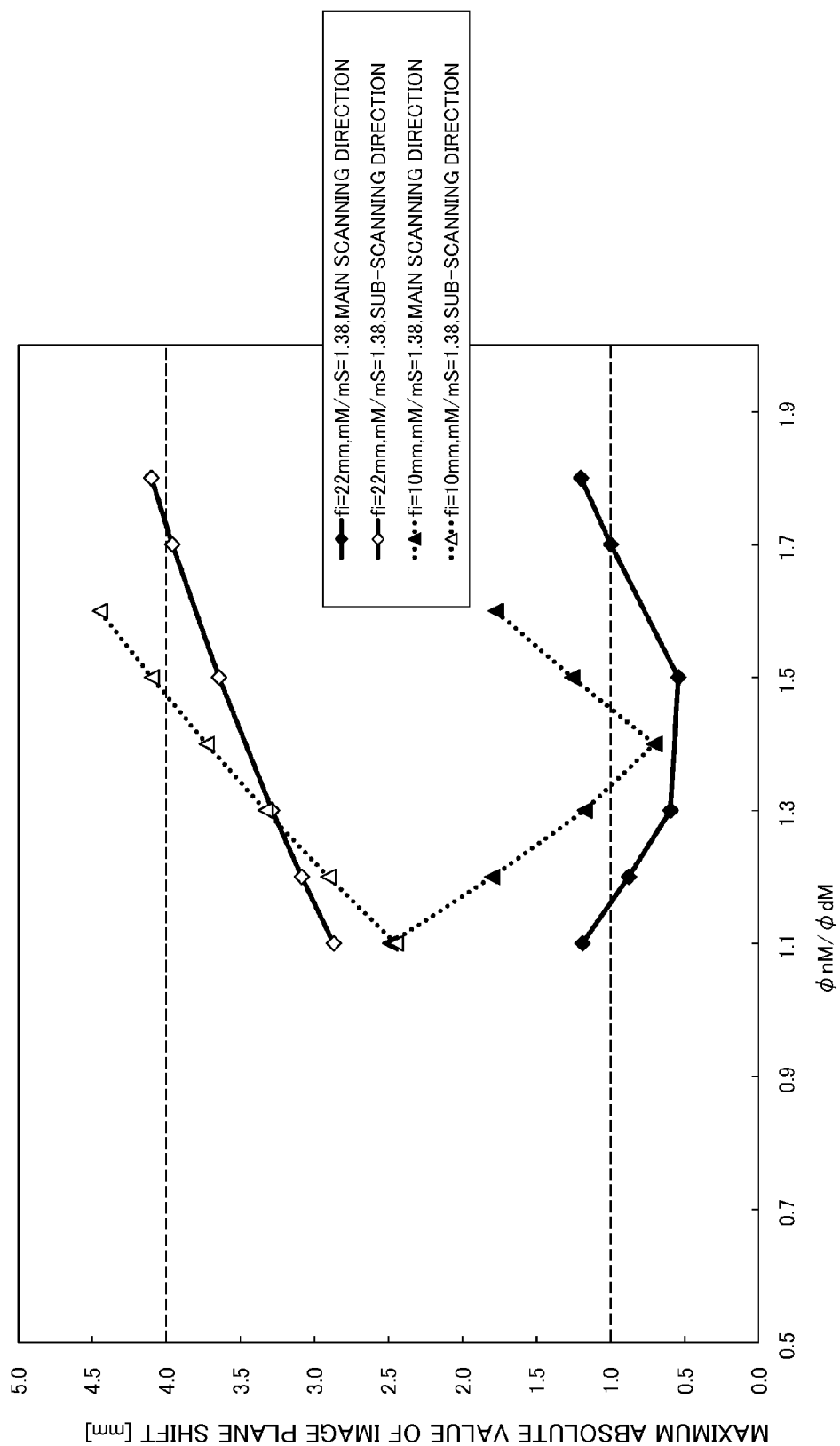
FIG. 7 is a graph showing a relationship between power ratios φnM/φdM in the main scanning direction and amounts of image plane shift, when a coefficient Z of linear expansion is $9.50 \times 10^{-5}$.
Figure 8:
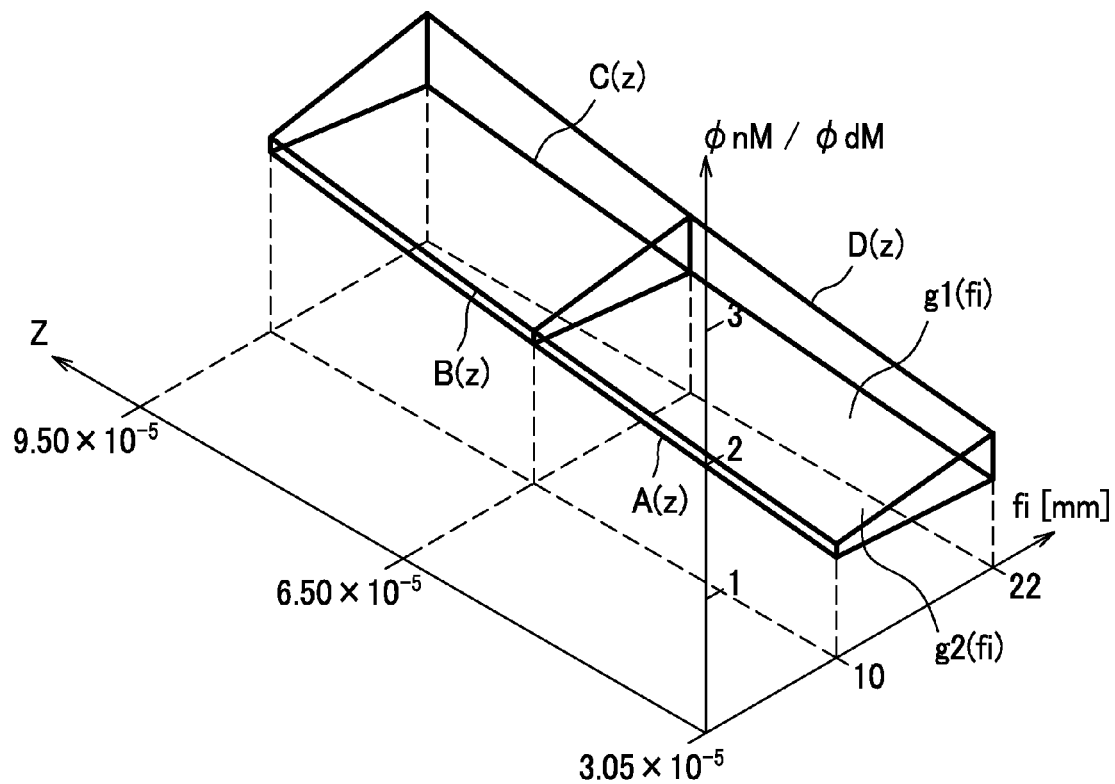
FIG. 8 is a graph showing ranges of power ratios φnM/φdM in the main scanning direction with an image plane shift falling within ±1 [mm] in the main scanning direction.

From observations of simulation results as shown in FIGS. 5-7, the range in which the amount of image plane shift in the main scanning direction is not greater than 1 [mm] and the amount of image plane shift in the sub-scanning direction is not greater than 4 [mm] is three-dimensionally shown in FIG. 8. It has been confirmed that if the amount of image plane shift in the main scanning direction is not greater than 1 [mm], then the amount of image plane shift in the sub-scanning direction is always not greater than 4 [mm].

In FIG. 8, ridge lines A(Z), B(Z), C(Z) and D(Z) are quadric curves obtained by approximation from the dots plotted for three values of the coefficient Z of linear expansion: 3.05×10$^{-5}$, 6.50×10$^{-5}$ and 9.50×10$^{-5}$.

By making use of the ridge lines A(Z), B(Z), C(Z) and D(Z), the range of the main scanning direction power ratio φnM/φdM in which the following inequality is satisfied is depicted in FIG. 8.

$$g2(fi) \leq \phi nM/\phi dM \leq g1(fi)$$

where $A(Z)=(1.897\times10^7)Z^2+6744Z+0.5255$, $B(Z)=(2.964\times10^7)Z^2+5645Z+0.6494$, $C(Z)=(3.270\times10^7)Z^2+3589Z+0.5250$, $D(Z)=(5.016\times10^7)Z^2+4571Z+0.8139$, $g1(fi)=fi\{D(Z)-B(Z)\}/12-5D(Z)/6+11B(Z)/6$, $g2(fi)=fi\{C(Z)-D(Z)\}/12-5C(Z)/6+11A(Z)/6$, and the focal length fi in the main scanning direction is in the range of $10 \leq fi \leq 22$ [mm].

If the main scanning direction power ratio φnM/φdM falls within the range shown in FIG. 8, the amount of image plane shift with a coefficient Z of linear expansion of the holding member falling within the range of $3.05\times10^{-5} \leq Z \leq 9.50\times10^{-5}$ and a focal length fi of the illumination optical system falling within the range of 10-22 [mm] can be restricted within the range of not greater than 1 [mm] in the main scanning direction and 4 [mm] in the sub-scanning direction. Accordingly, proper temperature compensation in the scanning optical apparatus can be achieved.

Besides Example 1 described above, several other examples in which proper temperature compensation can be achieved under the above conditions will be described below.

Example 2

The scanning optical apparatus in Example 2 is configured such that the coefficient Z of linear expansion is $6.50\times10^{-5}$ [1/K] and the focal length fi is 22 [mm]. The other conditions for simulation are as follows:

Wavelength of semiconductor laser: 792.6 [nm]
Range of temperature −5 to 55 [° C.]
Rate of change in wavelength of semiconductor laser: 0.238 [nm/° C.]
Focal length fi in main scanning direction of diffraction lens: 22 [mm]
Coefficient Z of linear expansion of member provided to retain distance between semiconductor laser and diffraction lens: $6.50\times10^{-5}$ [1/K]
Lateral magnification mM in main scanning direction of entire optical system: 6.70
Lateral magnification mS in sub-scanning direction of entire optical system: 4.85
Ratio of magnifications mM/mS: 1.38
Refractive power $\phi nM$ in main scanning direction of diffraction lens: 0.024
Diffractive power $\phi dM$ in main scanning direction of diffraction lens: 0.022
Main scanning direction power ratio $\phi nM/\phi dM$: 1.100
Refractive power $\phi nS$ in sub-scanning direction of diffraction lens: 0.03621
Diffractive power $\phi dS$ in sub-scanning direction of diffraction lens: 0.02198
Sub-scanning direction power ratio $\phi nS/\phi dS$: 1.65
Phase function of diffractive surface:

$$\phi = \sum_{n=1}^{10} C_n r^{2n}$$

$C_1 = -0.0110$

In this Example 2, the amount of image plane shift is 0.3 [mm] in the main scanning direction and 3.5 [mm] in the sub-scanning direction.

Example 3

The scanning optical apparatus in Example 3 is configured such that the coefficient Z of linear expansion is $6.50\times10^{-5}$ [1/K] and the focal length fi is 10 [mm]. The other conditions for simulation are as follows:

Wavelength of semiconductor laser: 792.6 [nm]
Range of temperature −5 to 55 [° C.]
Rate of change in wavelength of semiconductor laser: 0.238 [nm/° C.]
Focal length fi in main scanning direction of diffraction lens: 10 [mm]
Coefficient Z of linear expansion of member provided to retain distance between semiconductor laser and diffraction lens: $6.50\times10^{-5}$ [1/K]
Lateral magnification mM in main scanning direction of entire optical system: 15.11
Lateral magnification mS in sub-scanning direction of entire optical system: 10.95
Ratio of magnifications mM/mS: 1.38
Refractive power $\phi nM$ in main scanning direction of diffraction lens: 0.054
Diffractive power $\phi dM$ in main scanning direction of diffraction lens: 0.049
Main scanning direction power ratio $\phi nM/\phi dM$: 1.100
Refractive power $\phi nS$ in sub-scanning direction of diffraction lens: 0.06649
Diffractive power $\phi dS$ in sub-scanning direction of diffraction lens: 0.04929
Sub-scanning direction power ratio $\phi nS/\phi dS$: 1.35
Phase function of diffractive surface:

$$\phi = \sum_{n=1}^{10} C_n r^{2n}$$

$C_1 = -0.0246$

TABLE 2

Optical System in EXAMPLE 2

| SURFACE No. | SURFACE | RADIUS OF CURVATURE MAIN SCANNING DIRECTION | RADIUS OF CURVATURE SUB-SCANNING DIRECTION | DISTANCE | REFRACTIVE INDEX | OPTICAL ELEMENT |
|---|---|---|---|---|---|---|
| 1 | | ∞ | ∞ | 0.970 | 1 | |
| 2 | | ∞ | ∞ | 0.250 | 1.511 | GLASS COVER |
| 3 | | ∞ | ∞ | 21.73 | 1 | |
| 4 | DIFFRACTIVE SURFACE | ∞ | ∞ | 2.000 | 1.527 | DIFFRACTION LENS |
| 5 | ANAMORPHIC SURFACE | −21.791 | −14.548 | 57.35 | 1 | |
| 6 | | ∞ | ∞ | 42.35 | 1 | |
| 7 | ANAMORPHIC SURFACE | 67.257 | −12.543 | 13.00 | 1.527 | fθ LENS |
| 8 | ANAMORPHIC SURFACE | 152.98 | −9.618 | 98.8 | 1 | |

TABLE 3

Optical System in EXAMPLE 3

| SURFACE No. | SURFACE | RADIUS OF CURVATURE | | DISTANCE | REFRACTIVE INDEX | OPTICAL ELEMENT |
|---|---|---|---|---|---|---|
| | | MAIN SCANNING DIRECTION | SUB- SCANNING DIRECTION | | | |
| 1 | | ∞ | ∞ | 0.970 | 1 | |
| 2 | | ∞ | ∞ | 0.250 | 1.511 | GLASS COVER |
| 3 | | ∞ | ∞ | 8.47 | 1 | |
| 4 | DIFFRACTIVE SURFACE | ∞ | ∞ | 2.000 | 1.527 | DIFFRACTION LENS |
| 5 | ANAMORPHIC SURFACE | −9.716 | −7.924 | 56.33 | 1 | |
| 6 | | ∞ | ∞ | 42.35 | 1 | |
| 7 | ANAMORPHIC SURFACE | 67.257 | −12.543 | 13.00 | 1.527 | fθ LENS |
| 8 | ANAMORPHIC SURFACE | 152.98 | −9.618 | 98.8 | 1 | |

In this Example 3, the amount of image plane shift is 0.7 [mm] in the main scanning direction and 3.7 [mm] in the sub-scanning direction.

Example 4

The scanning optical apparatus in Example 4 is configured such that the coefficient Z of linear expansion is $9.50 \times 10^{-5}$ [1/K] and the focal length fi is 22 [mm]. The other conditions for simulation are as follows:

Wavelength of semiconductor laser: 792.6 [nm]
Range of temperature −5 to 55 [° C.]
Rate of change in wavelength of semiconductor laser: 0.238 [nm/° C.]

Refractive power $\phi nM$ in main scanning direction of diffraction lens: 0.028
Diffractive power $\phi dM$ in main scanning direction of diffraction lens: 0.018
Main scanning direction power ratio $\phi nM/\phi dM$: 1.500
Refractive power $\phi nS$ in sub-scanning direction of diffraction lens: 0.03958
Diffractive power $\phi dS$ in sub-scanning direction of diffraction lens: 0.01845
Sub-scanning direction power ratio ($\phi nS/\phi dS$: 2.15
Phase function of diffractive surface:

TABLE 4

Optical System in EXAMPLE 4

| SURFACE No. | SURFACE | RADIUS OF CURVATURE | | DISTANCE | REFRACTIVE INDEX | OPTICAL ELEMENT |
|---|---|---|---|---|---|---|
| | | MAIN SCANNING DIRECTION | SUB- SCANNING DIRECTION | | | |
| 1 | | ∞ | ∞ | 0.970 | 1 | |
| 2 | | ∞ | ∞ | 0.250 | 1.511 | GLASS COVER |
| 3 | | ∞ | ∞ | 21.63 | 1 | |
| 4 | DIFFRACTIVE SURFACE | ∞ | ∞ | 2.000 | 1.527 | DIFFRACTION LENS |
| 5 | ANAMORPHIC SURFACE | −19.035 | −13.312 | 57.99 | 1 | |
| 6 | | ∞ | ∞ | 42.35 | 1 | |
| 7 | ANAMORPHIC SURFACE | 67.257 | −12.543 | 13.00 | 1.527 | fθ LENS |
| 8 | ANAMORPHIC SURFACE | 152.98 | −9.618 | 98.8 | 1 | |

Focal length fi in main scanning direction of diffraction lens: 22 [Mm]
Coefficient Z of linear expansion of member provided to retain distance between semiconductor laser and diffraction lens: $9.50 \times 10^{-5}$ [1/K]
Lateral magnification mM in main scanning direction of entire optical system: 6.71
Lateral magnification mS in sub-scanning direction of entire optical system: 4.86
Ratio of magnifications mM/mS: 1.38

$$\phi = \sum_{n=1}^{10} C_n r^{2n}$$

$$C_1 = -0.0092$$

In this Example 4, the amount of image plane shift is 0.5 [mm] in the main scanning direction and 3.6 [mm] in the sub-scanning direction.

Example 5

The scanning optical apparatus in Example 5 is configured such that the coefficient Z of linear expansion is $7.40\times10^{-5}$ [1/K] and the focal length fi is 22 [mm]. The other conditions for simulation are as follows:

Wavelength of semiconductor laser: 792.6 [nm]
Range of temperature −5 to 55 [° C.]
Rate of change in wavelength of semiconductor laser: 0.238 [nm/° C.]
Focal length fi in main scanning direction of diffraction lens: 22 [nm]
Coefficient Z of linear expansion of member provided to retain distance between semiconductor laser and diffraction lens: $7.40\times10^{-5}$ [1/K]
Lateral magnification mM in main scanning direction of entire optical system: 6.70
Lateral magnification mS in sub-scanning direction of entire optical system: 4.85
Ratio of magnifications mM/mS: 1.38
Refractive power $\phi nM$ in main scanning direction of diffraction lens: 0.025
Diffractive power $\phi dM$ in main scanning direction of diffraction lens: 0.021
Main scanning direction power ratio $\phi nM/\phi dM$: 1.200
Refractive power $\phi nS$ in sub-scanning direction of diffraction lens: 0.03717
Diffractive power $\phi dS$ in sub-scanning direction of diffraction lens: 0.02098
Sub-scanning direction power ratio $\phi nS/\phi dS$: 1.77
Phase function of diffractive surface:

$$\phi = \sum_{n=1}^{10} C_n r^{2n}$$

$$C_1 = -0.0105$$

In this Example 5, the amount of image plane shift is 0.4 [mm] in the main scanning direction and 3.5 [mm] in the sub-scanning direction.

Example 6

The scanning optical apparatus in Example 6 is assumed to include a two-lens illumination optical system configuration with a collimating lens having a rotation-symmetric diffractive surface and a cylinder lens having an anamorphic refractive surface, wherein the coefficient Z of linear expansion is $6.50\times10^{-5}$ [1/K] and the focal length fi is 22 [mm]. The other conditions for simulation are as follows:

Wavelength of semiconductor laser: 792.6 [nm]
Range of temperature −5 to 55 [° C.]
Rate of change in wavelength of semiconductor laser: 0.238 [nm/° C.]
Focal length fi in main scanning direction of diffraction lens: 22 [nm]
Coefficient Z of linear expansion of member provided to retain distance between semiconductor laser and diffraction lens: $6.50\times10^{-5}$ [1/K]
Lateral magnification mM in main scanning direction of entire optical system: 6.63
Lateral magnification mS in sub-scanning direction of entire optical system: 4.81
Ratio of magnifications mM/mS: 1.38
Refractive power $\phi nM$ in main scanning direction of diffraction lens: 0.024
Diffractive power $\phi dM$ in main scanning direction of diffraction lens: 0.022
Main scanning direction power ratio $\phi nM/\phi dM$: 1.100
Refractive power $\phi nS$ in sub-scanning direction of diffraction lens: 0.03791
Diffractive power $\phi dS$ in sub-scanning direction of diffraction lens: 0.02198
Sub-scanning direction power ratio $\phi nS/\phi dS$: 1.72
Phase function of diffractive surface:

$$\phi = \sum_{n=1}^{10} C_n r^{2n}$$

$$C_1 = -0.0110$$

TABLE 5

Optical System in EXAMPLE 5

| SURFACE No. | SURFACE | RADIUS OF CURVATURE MAIN SCANNING DIRECTION | RADIUS OF CURVATURE SUB-SCANNING DIRECTION | DISTANCE | REFRACTIVE INDEX | OPTICAL ELEMENT |
|---|---|---|---|---|---|---|
| 1 |  | ∞ | ∞ | 0.970 | 1 |  |
| 2 |  | ∞ | ∞ | 0.250 | 1.511 | GLASS COVER |
| 3 |  | ∞ | ∞ | 21.70 | 1 |  |
| 4 | DIFFRACTIVE SURFACE | ∞ | ∞ | 2.000 | 1.527 | DIFFRACTION LENS |
| 5 | ANAMORPHIC SURFACE | −20.928 | −14.173 | 57.53 | 1 |  |
| 6 |  | ∞ | ∞ | 42.35 | 1 |  |
| 7 | ANAMORPHIC SURFACE | 67.257 | −12.543 | 13.00 | 1.527 | fθ LENS |
| 8 | ANAMORPHIC SURFACE | 152.98 | −9.618 | 98.8 | 1 |  |

TABLE 6

Optical System in EXAMPLE 6

| SURFACE No. | SURFACE | RADIUS OF CURVATURE | | DISTANCE | REFRACTIVE INDEX | OPTICAL ELEMENT |
| --- | --- | --- | --- | --- | --- | --- |
| | | MAIN SCANNING DIRECTION | SUB-SCANNING DIRECTION | | | |
| 1 | | ∞ | ∞ | 0.970 | 1 | |
| 2 | | ∞ | ∞ | 0.250 | 1.511 | GLASS COVER |
| 3 | | ∞ | ∞ | 21.74 | 1 | |
| 4 | DIFFRACTIVE SURFACE | ∞ | ∞ | 2.000 | 1.527 | COLLIMATING LENS |
| 5 | | −21.791 | −21.791 | 1.000 | 1 | |
| 6 | CYLINDRICAL SURFACE | ∞ | 38.372 | 2.000 | 1.527 | CYLINDER LENS |
| 7 | | ∞ | ∞ | 53.26 | 1 | |
| 8 | | ∞ | ∞ | 42.35 | 1 | |
| 9 | ANAMORPHIC SURFACE | 67.257 | −12.543 | 13.00 | 1.527 | fθ LENS |
| 10 | ANAMORPHIC SURFACE | 152.98 | −9.618 | 98.8 | 1 | |

In this Example 6, the amount of image plane shift is 0.3 [mm] in the main scanning direction and 3.1 [mm] in the sub-scanning direction.

What is claimed is:

1. A scanning optical apparatus comprising:
a light source;
a deflector configured to deflect a beam of light from the light source in a main scanning direction;
an illumination optical system disposed between the light source and the deflector and configured to convert the beam of light emitted from the light source into a beam of light slightly converging in the main scanning direction and focused near the deflector in a sub-scanning direction; and
a scan lens configured to cause the beam of light deflected by the deflector to be focused into a dot-like image on a target surface to be scanned,
wherein the scan lens satisfies:

$$0.2 \leq 1 - s'/fm \leq 0.5$$

where s' is a distance from an image-space principal point in the main scanning direction to an image point, and fm is a focal length in the main scanning direction,
wherein the illumination optical system has at least one rotation-symmetric diffractive surface and at least one anamorphic refractive surface, the illumination optical system having a focal length fi [mm] in the main scanning direction, which satisfies:

$$10 \leq fi \leq 22;$$

wherein a ratio mM/mS of a lateral magnification mM in the main scanning direction to a lateral magnification mS in the sub-scanning direction, of an entire optical system which includes the illumination optical system and the scan lens, satisfies:

$$mM/mS \geq 1.38;$$

wherein a holding member provided to retain a distance between the light source and the illumination optical system has a coefficient Z of linear expansion [1/K] which satisfies:

$$3.05 \times 10^{-5} \leq Z \leq 9.50 \times 10^{-5};$$

wherein the illumination optical system has a refractive power $\phi nM$ in the main scanning direction and a diffractive power $\phi dM$ in the main scanning direction, and a ratio $\phi nM/\phi dM$ of the refractive power $\phi nM$ to the diffractive power $\phi dM$ in the main scanning direction satisfies:

$$g2(fi) \leq \phi nM/\phi dM \leq g1(fi)$$

where $A(Z)=(1.897 \times 10^7)Z^2+6744Z+0.5255$, $B(Z)=(2.964 \times 10^7)Z^2+5645Z+0.6494$, $C(Z)=(3.270 \times 10^7)Z^2+3589Z+0.5250$, $D(Z)=(5.016 \times 10^7)Z^2+4571Z+0.8139$, $g1(fi)=fi\{D(Z)-B(Z)\}/12-5D(Z)/6+11B(Z)/6$, $g2(fi)=fi\{C(Z)-D(Z)\}/12-5C(Z)/6+11A(Z)/6$.

2. The scanning optical apparatus according to claim 1, wherein the illumination optical system is configured to have the rotation-symmetric diffractive surface provided at a lens surface closest to the light source, and to have the anamorphic refractive surface provided at a lens surface from which the beam of light exits the illumination optical system.

3. The scanning optical apparatus according to claim 1, wherein the coefficient Z of linear expansion is in the following range:

$$3.05 \times 10^{-5} \leq Z \leq 7.40 \times 10^{-5}.$$

4. The scanning optical apparatus according to claim 1, wherein the illumination optical system is a single plastic lens.

5. The scanning optical apparatus according to claim 1, wherein with a change in temperature of ±30° C. from a reference temperature of 25° C., an amount of image plane shift in the main scanning direction is not greater than 1 [mm] and an amount of image plane shift in the sub-scanning direction is not greater than 4 [mm].

* * * * *